US 7,148,979 B1

(12) United States Patent
Yanagawa

(10) Patent No.: US 7,148,979 B1
(45) Date of Patent: Dec. 12, 2006

(54) PRINTING SYSTEM AND METHOD OF DEALING WITH PROBLEMS IN SAID SYSTEM

(75) Inventor: Hitoshi Yanagawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/482,872

(22) Filed: Jan. 14, 2000

(30) Foreign Application Priority Data

Jan. 22, 1999 (JP) ................................. 11-014899

(51) Int. Cl.
G06F 15/00 (2006.01)
G06K 1/00 (2006.01)
(52) U.S. Cl. .......................... 358/1.15; 358/1.14; 399/8
(58) Field of Classification Search ........ 358/1.11–1.14, 358/1.15, 468, 1.9, 1.1, 1.16–1.18; 399/8, 399/9, 18–19, 81, 11, 13
See application file for complete search history.

(56) References Cited

U.S. PATENT DOCUMENTS

| | | | |
|---|---|---|---|
| 4,313,124 A | 1/1982 | Hara | 346/140 |
| 4,345,262 A | 8/1982 | Shirato et al. | 346/140 |
| 4,459,600 A | 7/1984 | Sato et al. | 346/140 |
| 4,463,359 A | 7/1984 | Ayata et al. | 346/1.1 |
| 4,558,333 A | 12/1985 | Sugitani et al. | 346/140 |
| 4,723,129 A | 2/1988 | Endo et al. | 346/1.1 |
| 4,740,796 A | 4/1988 | Endo et al. | 346/1.1 |
| 6,108,099 A * | 8/2000 | Ohtani | 358/1.15 |
| 6,185,379 B1 * | 2/2001 | Lay et al. | 399/11 |
| 6,333,790 B1 * | 12/2001 | Kageyama | 358/1.15 |
| 6,400,462 B1 * | 6/2002 | Hille | 358/1.14 |
| 6,430,711 B1 * | 8/2002 | Sekizawa | 714/47 |
| 6,473,192 B1 * | 10/2002 | Kidani et al. | 358/1.14 |

FOREIGN PATENT DOCUMENTS

| | | |
|---|---|---|
| EP | 0848322 A1 | 6/1998 |
| GB | 2305818 A | 4/1997 |
| JP | 54-056847 | 5/1979 |

(Continued)

OTHER PUBLICATIONS

European Search Report dated Jul. 28, 2004, issued in corresponding European Application No. 00 30 0309.

*Primary Examiner*—Edward Coles
*Assistant Examiner*—Thierry L. Pham
(74) *Attorney, Agent, or Firm*—Fitzpatrick, Cella, Harper & Scinto

(57) ABSTRACT

Disclosed is a system through which the nature of a problem in an apparatus is analyzed and the appropriate countermeasures displayed automatically by a computer that is capable of responding to an inquiry in the proper manner, thereby making it possible to determine the cause of the problem accurately and to deal with the problem quickly in round-the-clock support. A printer includes a controller having an internal store of information concerning sites to which inquiries regarding printer problems may be directed. A service depot computer is queried with regard to printer problems requiring maintenance by a serviceman. In a case where, depending upon the measures taken by the customer, it is possible for the customer to solve the problem himself without the assistance of a serviceman, a customer support computer is queried in regard to the nature of the problem. A message concerning countermeasures is received from the service depot computer or customer support computer and is displayed on a host computer. In a case where the problem can be dealt with through a simple operation, the host computer itself analyzes the nature of the problem and displays the countermeasures.

37 Claims, 9 Drawing Sheets

FOREIGN PATENT DOCUMENTS

| | | |
|---|---|---|
| JP | 59-123670 | 7/1984 |
| JP | 59-138461 | 8/1984 |
| JP | 60-071260 | 4/1985 |
| WO | WO 9849012 A1 * | 11/1998 |

* cited by examiner

FIG. 5

| PROBLEM TYPE | INTERNET ADDRESS (WEBSITE URL) | PROBLEM CODE | NATURE OF PROBLEM | ANSWERS |
|---|---|---|---|---|
| A | NONE | 105 | PAPER LOADED ? | OUT OF PAPER. |
| A | NONE | 106 | HEAD NOT MOUNTED ? | HEAD IS NOT MOUNTED. |
| A | NONE | 107 | COVER LEFT OPEN | COVER IS OPEN. |
| A | NONE | 108 | PAPER JAM | REMOVE JAMMED PAPER. |
| A | NONE | 109 | NO INK | OUT OF INK. |
| B | http://www.design.service.co.jp | 110 | $5^V$ NORMAL ? | NO $5^V$ DC. TAKE PRINTER TO SERVICE DEPOT. |
| B | http://www.design.service.co.jp | 111 | VM (MOTOR VOLTAGE) NORMAL ? | NO MOTOR VOLTAGE. TAKE PRINTER TO SERVICE DEPOT. |
| B | http://www.design.service.co.jp | 112 | VH (HEAD VOLTAGE) NORMAL ? | NO HEAD VOLTAGE. TAKE PRINTER TO SERVICE DEPOT. |
| B | http://www.design.service.co.jp | 113 | Tφ (AMBIENT TEMPERATURE) NORMAL ? | PRINTER TEMPERATURE IS ABNORMAL. TAKE PRINTER TO SERVICE DEPOT. |
| B | http://www.design.service.co.jp | 114 | TH (HEAD TEMPERATURE) NORMAL ? | HEAD TEMPERATURE IS ABNORMAL. TAKE PRINTER TO SERVICE DEPOT. |
| C | http://www.customer.service.co.jp | 115 | QUESTION CONCERNING PAPER | "AN APPROPRIATE ANSWER TO YOUR INQUIRY CORRESPONDING TO THIS PROBLEM CODE WILL BE PROVIDED BY THE PROGRAM AVAILABLE AT YOUR CUSTOMER DEPOT" |
| C | http://www.customer.service.co.jp | 116 | QUESTION CONCERNING SPECS | |
| C | http://www.customer.service.co.jp | 117 | REGARDING PRODUCT INQUIRIES | |

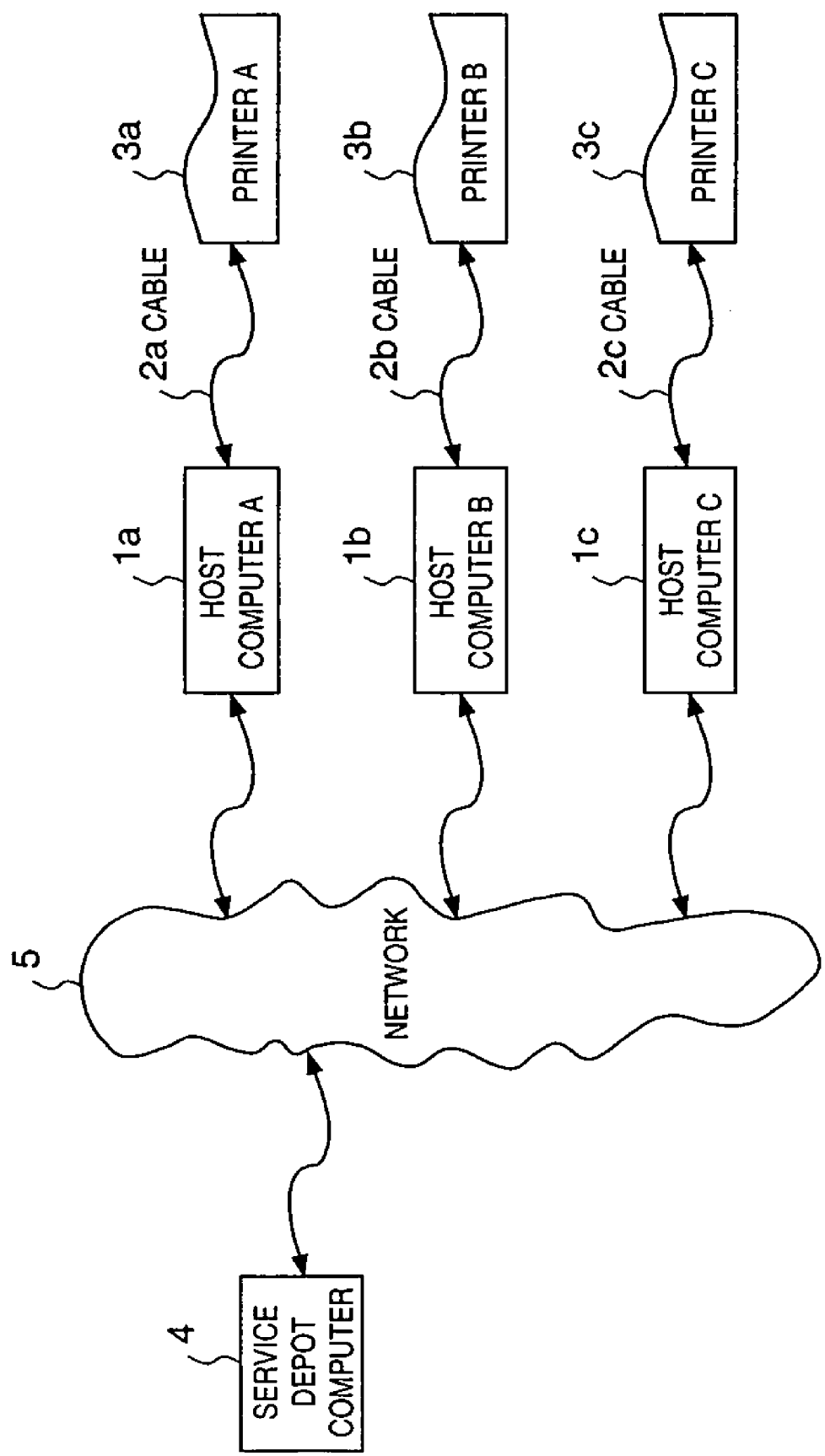

PRINTING SYSTEM AND METHOD OF DEALING WITH PROBLEMS IN SAID SYSTEM

BACKGROUND OF THE INVENTION

This invention relates to a data communication system and to a method of dealing with problems which arise in this data communication system.

When a problem develops during printing with a printing apparatus connected to a host computer via a prescribed cable so as to be capable of communicating with the host computer, there are occasions where the operator cannot readily ascertain the cause of the problem. For example, if the accompanying operating manual says that three successive beep tones mean that there is not enough ink, no difficulty will arise so long as the operator remembers what measures are to be taken to deal with this situation. However, there are often occasions where the operator does not remember or never memorized what action to take. In such cases the operator cannot determine the cause of the problem unless the pertinent description is found in the operating manual. There are also instances where the manual is not readily available, in which case it is very difficult to ascertain the cause of the problem.

In systems available for dealing with such problems, a printer driver installed in the host computer displays the causes of simple problems such as "① Out of Paper", "② Paper Jam", "③ Out of Ink", etc. and uses the display of the host computer to tell the operator what measures to take.

However, programming the software of the printer driver to contain measures for all possible problems is impractical because of limitations imposed by available memory capacity. There are also problems that are difficult for the operator to understand.

Accordingly, for problems that are not so simple, such as when a diode for sensing head temperature fails, when the voltage for driving a paper-feed motor is inadequate or when it is not possible to introduce power, there are no specifications dealing with countermeasures and the state of the art is such that the operator must call and wait for the arrival of a serviceman before the cause of the problem can be tracked down. Furthermore, even if the cause is determined, there are occasions where the apparatus cannot be repaired on-site if replacement parts have not been brought.

SUMMARY OF THE INVENTION

Accordingly, an object of the present invention is to provide a data communication system and a problem management method for this system through which it is possible to analyze the causes of problems in advance.

Another object of the present invention is to provide a system through which the nature of a problem is analyzed and the appropriate countermeasures displayed automatically by a computer that is capable of responding to an inquiry in the proper manner, thereby making it possible to determine the cause of the problem accurately and to deal with the problem quickly in round-the-clock support.

According to the present invention, the foregoing objects are attained by providing a communication system in which an image forming apparatus capable of forming images and a countermeasure specifying computer, which is capable of specifying a countermeasure when a specific event has occurred in the image forming apparatus, are capable of being connected to each other via a communication network, wherein the image forming apparatus includes: storage means for storing identifying information which identifies a countermeasure specifying computer that is capable of specifying a countermeasure when the specific event occurs; sending means for sending specific-event information concerning the specific event to the countermeasure specifying computer that corresponds to the identifying information of the countermeasure specifying computer stored by the storage means, the specific-event information being sent when the specific event occurs; and answer display means for receiving and displaying an answer from this countermeasure specifying computer in response to the specific-event information sent by the sending means; and the countermeasure specifying computer includes specifying means for analyzing the specific-event information from the image forming apparatus and specifying an answer.

By way of example, the specific event is a printer problem, the storage means is provided in the printer, and the sending means and answer display means are provided in a printer control computer.

Further, according to the present invention, the foregoing objects are attained by providing a communication system in which an image forming apparatus capable of forming images and a countermeasure specifying computer, which is capable of specifying a countermeasure when a problem has occurred in the image forming apparatus, are capable of being connected to each other via a communication network, wherein the image forming apparatus has means for storing identifying information which identifies a countermeasure specifying computer that is capable of specifying a countermeasure when the problem occurs, sending problem information concerning the problem to the countermeasure specifying computer that corresponds to the stored identifying information of the countermeasure specifying computer when the problem occurs, and receiving and displaying an answer from this countermeasure specifying computer in response to the sent problem information; and the countermeasure specifying computer includes means for analyzing the problem information from the image forming apparatus and sending back an answer.

By way of example, the image forming apparatus further includes a printer for printing out input information, and a printer control computer connected to the printer.

Further, by way of example, the printer control computer has countermeasure display means for analyzing the nature of a problem autonomously and displaying a countermeasure in a case where the problem can be eliminated by a simple operation performed by the operator.

Further, by way of example, the countermeasure specifying computer is a service depot computer. Alternatively, the countermeasure specifying computer is a service depot computer if the problem is one requiring maintenance by a serviceman and a customer support computer if the problem is one capable of being eliminated by operator endeavor without requiring assistance of a serviceman.

Furthermore, by way of example, the communication network is the Internet communication network, and the identifying information of the countermeasure specifying computer is an Internet address (URL).

Further, by way of example, a plurality of image forming apparatus are connected to the countermeasure specifying computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is a diagram useful in describing examples of answers in a case where a service depot computer of the printer according to this embodiment has been queried in regard to the nature of a problem;

FIG. 9 is a diagram showing the configuration of a system according to a third embodiment of the present invention.

DESCRIPTION OF THE PREFERRED EMBODIMENTS

Figure 1:
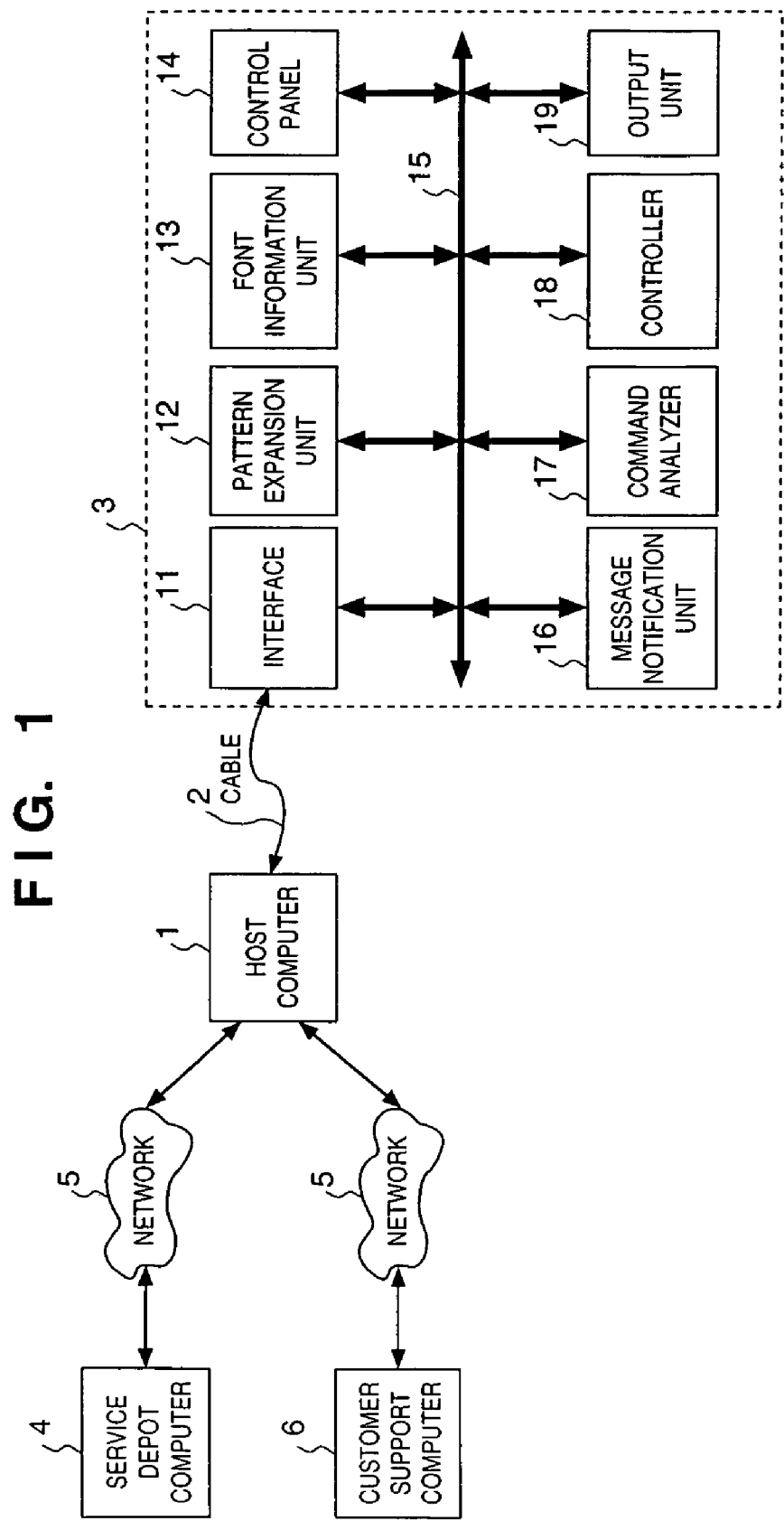
FIG. 1 is a block diagram illustrating the configuration of a printing system embodying the present invention.

Preferred embodiments of the present invention will now be described in detail with reference to the drawings.

First Embodiment

A preferred embodiment of the present invention will now be described with reference to FIG. 1, which is a block diagram illustrating the configuration of a printing system embodying the present invention. The printing system according to this embodiment includes a host computer 1, a printing apparatus 3, a cable 2 connecting the host computer 1 and the printing apparatus 3, a service depot computer 4, and networks 5 for connecting the host computer 1 to the service depot computer 4 and to a customer support computer 6.

The host computer 1 sends the printing apparatus 3 printing-related information such as print data and a print command using the software of an enabled printer driver and sends the service depot computer 4 or customer support computer 6 problem information, which is information concerning a particular problem.

The printing apparatus 3 executes printing processing in accordance with the printing-related information sent. The printing apparatus 3, which is constituted by a microprocessor system that includes a read-only memory (ROM) and a random-access memory (RAM), functionally comprises the components described below.

Specifically, the printing apparatus 3 has an interface 11 for exchanging data with the host computer 1, a pattern expansion unit 12 for expanding data such as text and graphics in memory, a font information unit 13 for storing font information, a control panel 14 used to set various parameters for controlling printing, and a data bus 15. The printing apparatus 3 further includes a message notification unit 16 for reporting a message from the printing apparatus 3 to the host computer 1, a command analyzer 17 for analyzing print data from the host computer 1 via the cable 2, a controller 18 for controlling the overall apparatus, and an output unit 19, which comprises, e.g., an ink-jet printer, for forming a visible data image on paper.

The controller 18 has a central processing unit (CPU), a ROM and a RAM and controls the overall operation of the printing apparatus 3, such as the reading and writing of information.

The pattern expansion unit 12 has a memory comprising a RAM capable of being freely read and written. The command analyzer 17 is expressed in the form of hardware but analyzes commands by processing software using the CPU of the controller 18. It should be noted that the command analyzer 17 may be constituted by a decoder instead of relying upon software processing.

The details of the output unit 19 will now be described. The output unit 19 may be a laser printer or thermal-transfer printer as well as an ink-jet printer. The output unit 19 may also be a color printer. Further, the output unit 19 is not limited to a bilevel-output printer and may be a multilevel-output printer.

Figure 2:
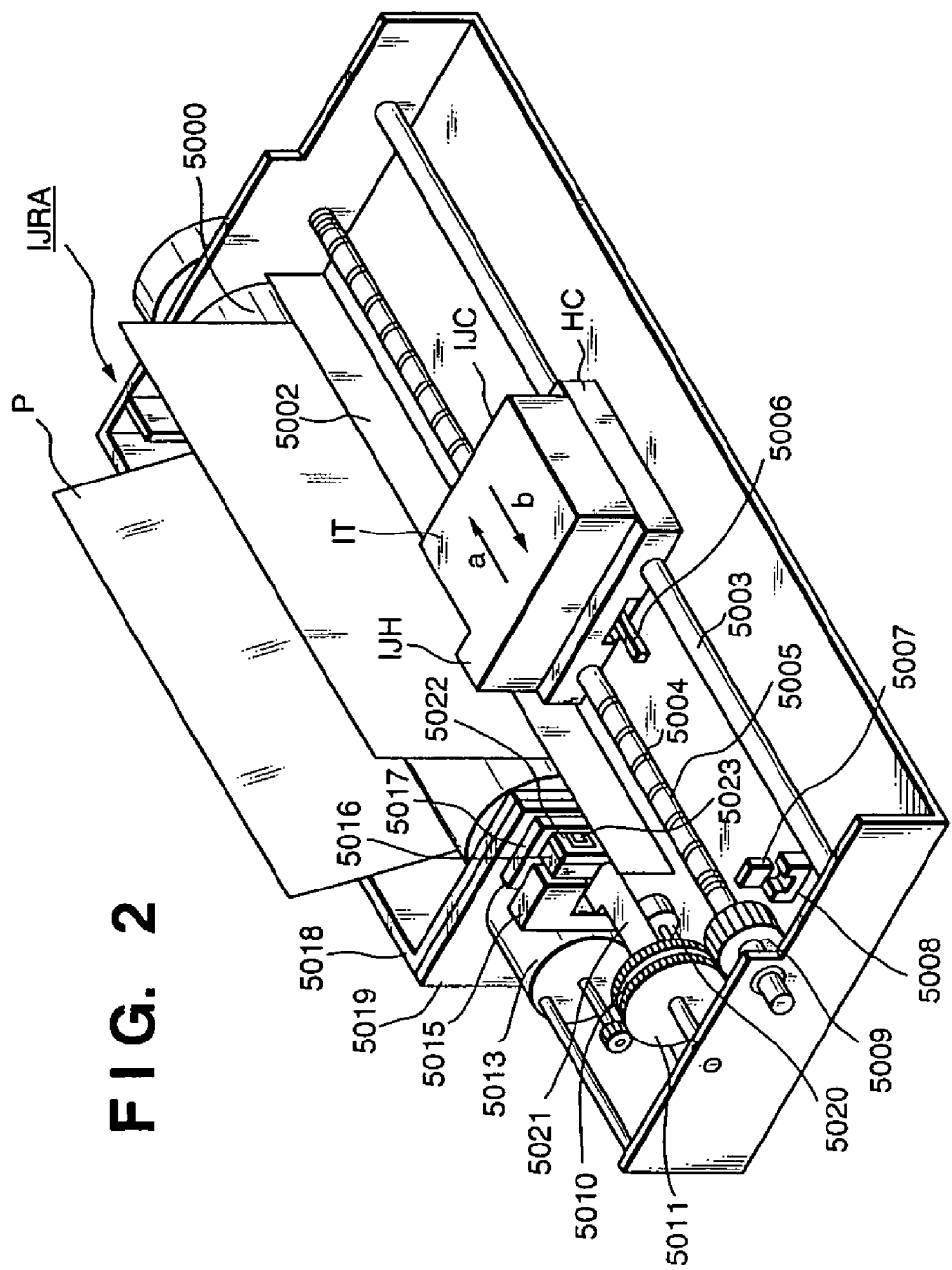
FIG. 2 is an external perspective view showing the structure of an ink-jet printer, which is a typical embodiment of an output unit shown in FIG. 1.

FIG. 2 is an external perspective view showing the structure of an ink-jet printer IJRA, which is a typical embodiment of the output unit 19 shown in FIG. 1.

In FIG. 2, a carriage HC is engaged with a helical groove 5004 of a lead screw 5005 rotated via driving force transmission gears 5011, 5009 in operative association with the forward and reverse rotation of a driving motor 5013. The carriage HC has a pin (not shown) moved back and forth in directions of arrows a and b. An ink-jet cartridge IJC is mounted on the carriage HC. Numerals 5002 denote a paper retaining plate which presses paper against a platen 5000 along the traveling direction of the carriage. Numerals 5007, 5508 denotes photocouplers which constitute home position sensing means for verifying the presence of a carriage lever 5006 in the vicinity of the photocouplers and changing over the direction in which the motor 5013 is rotated. Numerals 5016 denote a member which supports a cap member 5022, which is for capping the front side of the recording head. Numerals 5015 denote suction means for applying suction to the cap to subject the cap to suction recovery via an opening 5023 inside the cap. Numerals 5019 denote a member which makes it possible to move a cleaning blade 5017 back and forth. The cleaning blade 5017 and the member 5019 are supported on a support plate 5018. It goes without saying that the blade need not be of this type and that a well-known cleaning blade can be applied to this example. Numeral 5021 denotes a lever for starting the suction of the suction recovery operation. The lever moves with movement of a cam 5020 engaged with the carriage. Movement is controlled by well-known transfer means whereby the driving force from the driver motor is changed over as by a clutch.

The capping, cleaning and suction recovery operations are so arranged that the desired processing is performed at the corresponding positions by the action of the lead screw 5005 when the carriage arrives in an area on the home-position side. However, if it is so arranged that the desired operations are performed at well-known timings, this arrangement can also be applied to this example.

The present invention is described in regard to a printing apparatus particularly of the ink-jet printing type, in which the apparatus is equipped with means (e.g., an electrothermal transducer or laser beam mechanism) for generating thermal energy as the energy utilized to discharge ink, wherein a change in the state of the ink is brought about by this thermal energy.

With regard to a typical configuration and operating principle, it is preferred that the foregoing be achieved using the basic techniques disclosed in the specifications of U.S. Pat. Nos. 4,723,129 and 4,740,796. This scheme is applicable to both so-called on-demand-type and continuous-type apparatus. In the case of the on-demand type, at least one drive signal, which provides a sudden temperature rise that exceeds that for film boiling, is applied, in accordance with printing information, to an electrothermal transducer arranged to correspond to a sheet or fluid passageway holding a fluid (ink). As a result, thermal energy is produced in the electrothermal transducer to bring about film boiling on the thermal working surface of the ink-jet head. Accordingly, air bubbles can be formed in the fluid (ink) in one-to-one correspondence with the drive signals. Owing to growth and contraction of the air bubbles, the fluid (ink) is jetted via an orifice so as to form at least one droplet. If the drive signal has the form of a pulse, growth and contraction of the air bubbles can be made to take place rapidly and in appropriate fashion. This is preferred since it will be possible to achieve fluid (ink) discharge exhibiting excellent response.

Signals described in the specifications of U.S. Pat. Nos. 4,463,359 and 4,345,262 are suitable as drive pulses having this pulse shape. It should be noted that even better printing can be performed by employing the conditions described in the specification of U.S. Pat. No. 4,313,124, which discloses an invention relating to the rate of increase in the temperature of the above-mentioned thermal working surface.

In addition to the combination of the orifice, fluid passageway and electrothermal transducer (in which the fluid passageway is linear or right-angled) disclosed as the construction of the print head in each of the above-mentioned specifications, an arrangement using the art described in the specifications of U.S. Pat. Nos. 4,558,333 and 4,459,600, which disclose elements disposed in an area in which the thermal working portion is curved, may be employed. Further, it is possible to adopt an arrangement based upon Japanese Patent Application Laid-Open No. 59-123670, which discloses a configuration having a common slot for the ink discharge portions of a plurality of electrothermal transducers, or Japanese Patent Application Laid-Open No. 59-138461, which discloses a configuration having openings made to correspond to the ink discharge portions, wherein the openings absorb pressure waves of thermal energy.

As a print head of the full-line type having a length corresponding to the maximum width of the printing medium capable of being printed on by the printing apparatus, use can be made of an arrangement in which the length is satisfied by a combination of plural print heads of the kind disclosed in the foregoing specifications, or an arrangement in which print heads serve as a single integrally formed print head.

The print head may be of the replaceable tip-type, in which the electrical connection to the apparatus proper and the supply of ink from the apparatus proper can be achieved by mounting the head on the apparatus proper, or of the cartridge type, in which the print head itself is integrally provided with an ink tank.

In order to make the effects of printing much more stable, it is preferred that the printing apparatus of the present invention be additionally provided with print head recovery means and auxiliary means, etc. Specific examples are print head capping means, cleaning means, pressurizing or suction means, preheating means comprising an electrothermal transducer, a heating element separate from this transducer or a combination of the transducer and the heating element, and a pre-discharge mode for performing a discharge of ink separate from a discharge for printing. These expedients are effective in achieving stable printing.

The printing mode of the printing apparatus is not limited to a printing mode solely for the mainstream colors such as black and white. The apparatus adopted can be one equipped with at least one print head for a plurality of different colors or one full-color print head using mixed colors, though it is desired that this be achieved by a print head having an integrated structure or by a combination of a plurality of print heads.

Further, the embodiment of the present invention set forth above is described on the assumption that ink is the fluid. The ink used may be one which solidifies at room temperature or lower, one which softens at room temperature or one which is a liquid at room temperature. In general, temperature control is performed in such a manner that ink viscosity will fall within a stable ink jetting range by adjusting the temperature of the ink itself so as to fall within a temperature range of no less than 30° C. to no greater than 70° C. Accordingly, it will suffice to use an ink liquefied when the printing signal is applied.

In order to positively prevent elevated temperature due to thermal energy by using this as the energy for converting the ink from the solid state to the liquid state, or in order to prevent evaporation of the ink, it is permissible to use an ink which solidifies when left standing but which is liquefied by application of heat. In any case, ink which is liquefied for the first time by thermal energy, such as an ink liquefied by application of thermal energy conforming to a printing signal and jetted as a liquid ink, or ink which has already begun to solidify at the moment it reaches the printing medium, can be applied to the present invention. Such inks may be used in a form in which they oppose the electrothermal transducer in a state in which they are held as a liquid or solid in the recesses or through-holes of a porous sheet, as described in Japanese Patent Application Laid-Open Nos. 54-56847 and 60-71260. In the present invention, the most effective method of dealing with these inks is the above-described method of film boiling.

A printing apparatus according to the present invention may take on a variety of forms. It may be provided as an integral part of or separate from an information processing device such as a computer and serve as the image output terminal thereof, as a copier apparatus in combination with a reader or the like, or as a facsimile machine having sending and receiving functions.

The components of the controller 18 shown in FIG. 1 will be described with reference to FIG. 3, which is a block diagram showing the details of the controller 18 illustrated in FIG. 1.

Figure 3:
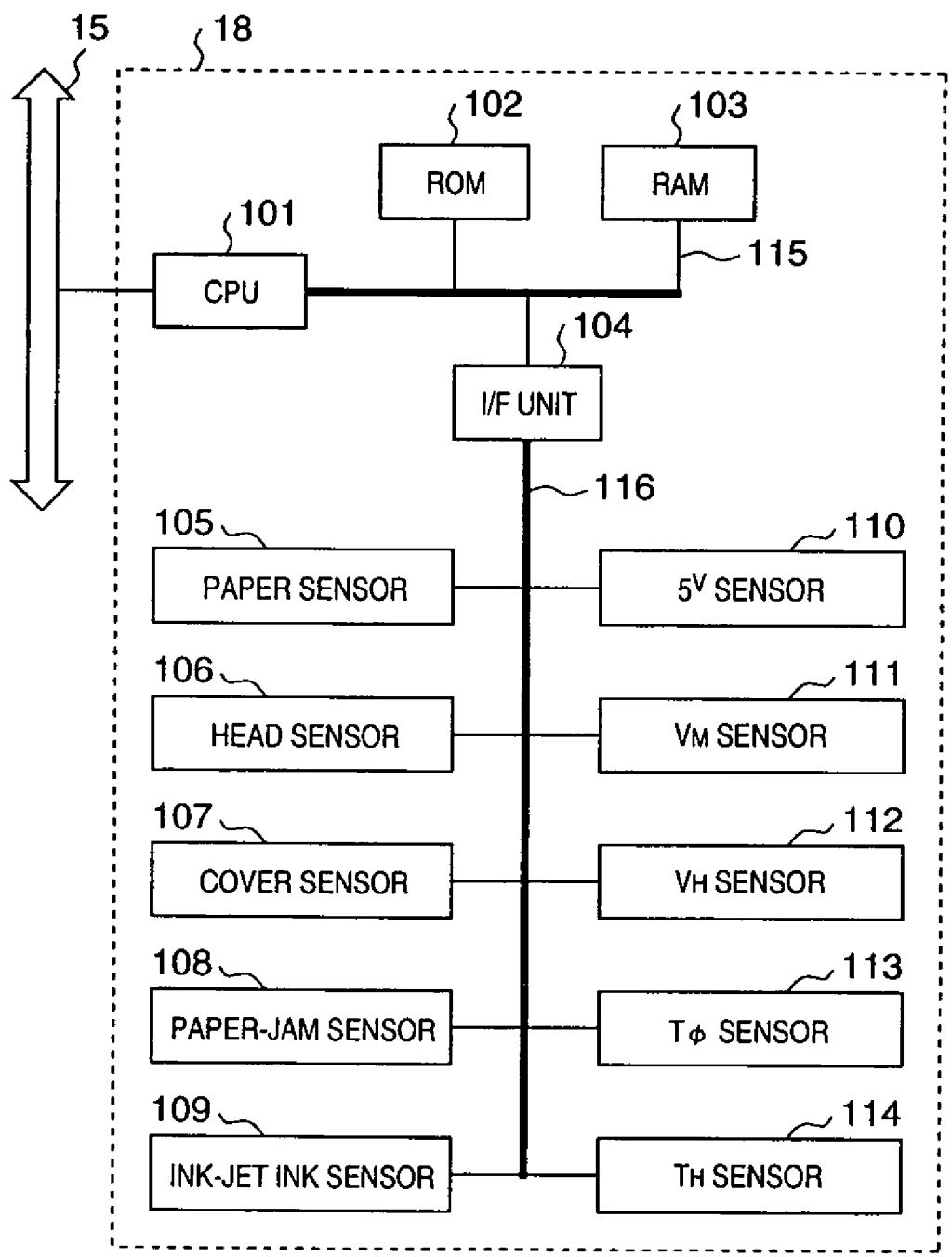
FIG. 3 is a block diagram showing the construction of a control circuit for controlling the ink-jet printer.

As shown in FIG. 3, the controller 18 includes a central processing unit (CPU) 101, a read-only memory (ROM) 102, a random-access memory (RAM) 103, an interface (I/F) 104 and a local data bus 115. The controller 18 further includes a paper sensor 105, a head sensor 106, a cover sensor 107, a paper-jam sensor 108, an ink-jet ink sensor 109, a sensor 110 for sensing power-supply voltage (5 V) of the controller, a sensor 111 for sensing monitor voltage ($V_M$), a sensor 112 for sensing head voltage ($V_H$), a sensor 113 for sensing ambient temperature ($T_a$), a sensor 114 for sensing head temperature ($T_H$), and a data bus 116 for connecting each sensor with the interface 104.

The sensor 110 for sensing power-supply voltage (5 V) of the controller, the sensor 111 for sensing monitor voltage ($V_M$) and a sensor 112 for sensing head voltage ($V_H$) sense the respective power-supply voltages of the printing apparatus 3.

The command structure which controls the printing apparatus 3 is stored in the ROM 102. When a power switch (not shown) is closed, the stored content of the ROM 102 is read out and decoded under the control of the CPU 101, whereby the printing apparatus begins operating.

The ROM 102 also contains addresses of inquiry destinations for when problems occur, and codes that are classified by level of the problem. For example, the address of a printer service depot computer is stored in the ROM 102 beforehand as an inquiry destination for when a problem occurs.

According to this embodiment and by way of example, an Internet address (URL) is adopted as the inquiry destination, with the following address information being stored in the form of an ASCII code:

$$\text{http://www.design.service.co.jp} \tag{1}$$

Among the problems sensed by the sensors 105 to 109 of the printing apparatus 3, there are certain simple problems that the operator of the apparatus can readily deal with to effect recovery, such as the sensing of "PAPER LOADED?", "HEAD MOUNTED?" and "COVER OPEN OR CLOSED" and problems such as "PAPER JAM DURING OPERATION" and "OUT OF INK". For these simple problems, control is exercised in such a manner that the problems are displayed on the display of the host computer 1 by the printer driver in the same way as in the prior art. An example of such a display is illustrated in FIG. 4.

Figure 4:
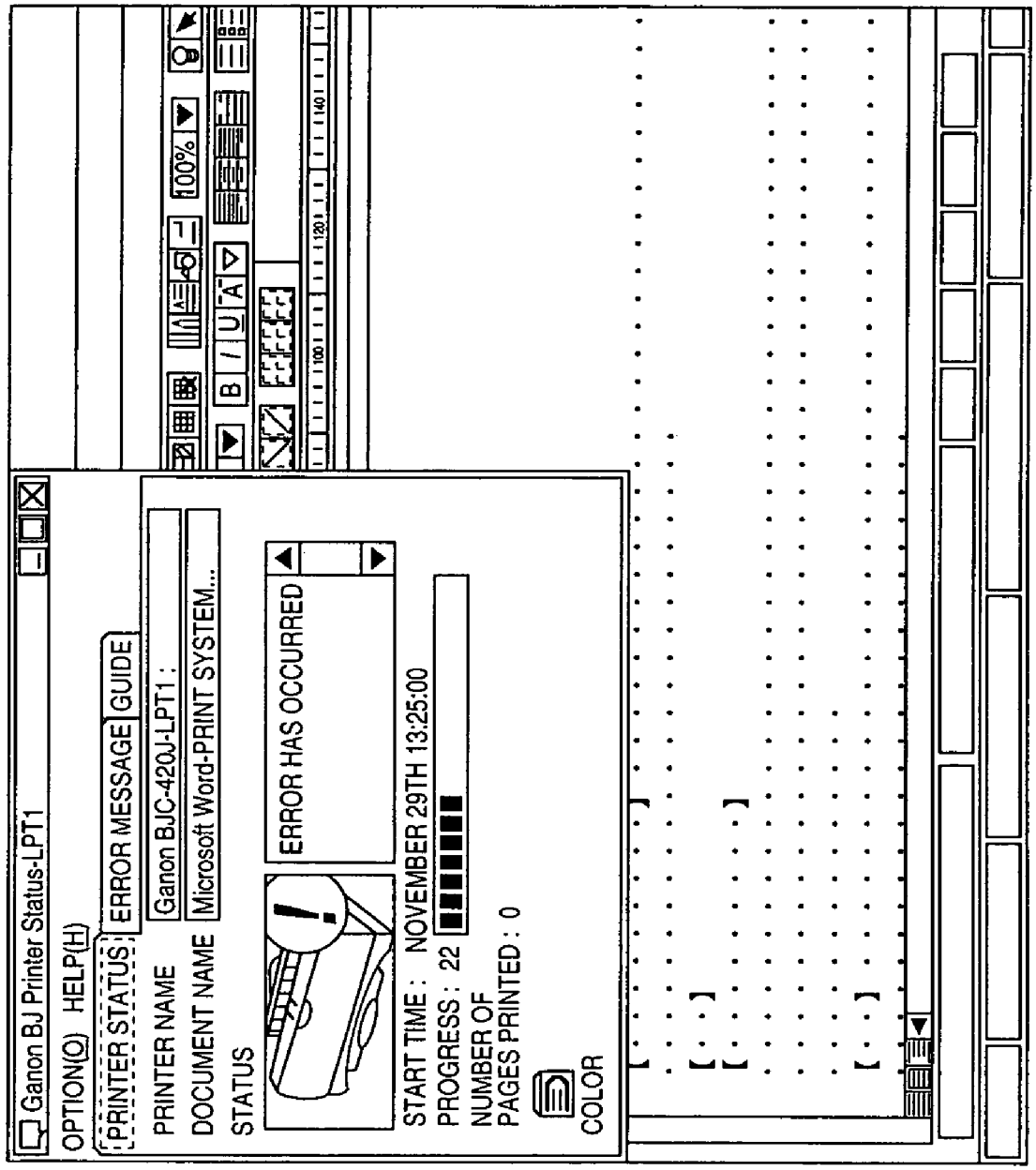
FIG. 4 is a diagram showing the display screen examples of the host computer to tell operator what measures to take.

By observing the display shown in FIG. 4 on the display of the host computer 1, the operator can identify the cause of the problem, eliminate the cause and then start the printing operation again. The operator is allowed to take the proper measures upon checking the display on the host computer even if the operator contacts a serviceman.

However, there are problems, even if they are displayed on the display of the host computer 1 using the printer driver, for which there are no countermeasures that can be taken by the operator. These are problems capable of being sensed by the sensors 110 to 114, namely whether the "5 V voltage", "$V_M$ voltage" and "$V_H$ voltage" are normal or not, whether the ambient temperature $T_a$ is too high or too low and whether the head temperature $T_H$ is normal or not.

There are other problems besides these and they are too numerous to cite here. If a countermeasures program run by the printer driver of the host computer 1 were included to cope with all of these problems, an enormous memory capacity would be required and the operator would be confronted with a very laborious operation.

In the event of a problem from which it is difficult for the operator to effect recovery, such as a problem sensed by any of the sensors 110 to 114, the printer driver is notified of problem detection by any of the sensors 110 to 114 and causes an Internet address (URL) of the kind indicated by (1) above, which has been stored in the ROM, to be displayed on the display of the host computer 1.

The operator observes the display, effects a connection to the Internet and queries the printer service depot computer about the nature of the problem.

The service depot computer judges that the relevant problem codes are 110, 111, 112, . . . and displays answers on the display of the host computer 1 via the network 5 to indicate the cause of the problem.

An example of the answers is shown in FIG. 5. In this example, the types of problems are into types A, B and C.

A problem of Type A is capable of being resolved by the operator per se, a problem of Type B is technical and cannot be resolved by the operator per se, and a problem of Type C relates to a question the operator wishes to inquire about.

Internet addresses (website URLs) specify transfer destinations, which depend upon the problem type.

For problems of Type A, the answer can be provided by the printer driver in a manner similar to that of the prior art, as shown in FIG. 4, and therefore transfer-destination address is displayed (i.e., "NONE" is displayed).

For problems of Type B, the following Internet address (URL) of the service depot computer 4:

$$\text{http://www.design.service.co.jp} \tag{2}$$

is displayed according to the example of FIG. 5, and for problems of Type C, the following Internet address (URL) of the customer support computer 9:

$$\text{http://www.customer.service.co.jp} \tag{3}$$

is displayed according to the example of FIG. 5.

Thus, the destination address that conforms to the nature of the particular problem is displayed.

In the example of the problem codes shown in FIG. 5, answers are classified depending upon the nature of the problem in the manner described below.

[Relationship Between Examples of Displays Shown in FIG. 5 and Content Stored in ROM 102]

When paper fails to be fed or printing fails to be performed owing to an abnormal $V_M$(motor voltage), for example, the CPU senses information 111 from the interface 104, reads the corresponding problem-code information [indicated by (4) below)] out of the ROM 102 and sends this information to the host computer.

The following information:

$$\begin{array}{l}\text{B (problem type) http://www.design.service.co.jp}\\\text{(Internet address) 111}\end{array} \tag{4}$$

has been stored in the ROM 102 as an example of content in the form of an ASCII code, by way of example.

After receiving the information indicated by (4) above, the program of the printer driver that has been installed in the host computer 1 analyzes the information, displays the result of analysis on the computer display screen and seeks a decision from the operator as to whether or not the service depot ("design service") is to be queried.

If consent is obtained, the printer driver sends the problem code 111 to the service depot ("design service") department indicated by (2) above, obtains the reply, which is the result provided by the service depot ("design service") department, from the service depot computer 4 and displays the reply on the display to notify the operator.

In this case, for example, "NO MOTOR VOLTAGE. TAKE PRINTER TO SERVICE DEPOT." is displayed.

In the case of the problem codes 115 to 117, these codes are sent to the customer support ("customer service") computer 6. The latter refers to a program that has been installed in this computer, deduces the answers that correspond to the problem codes and automatically sends the answers back to the host computer 1 that originally issued the problem codes 115 to 117.

Figure 6:
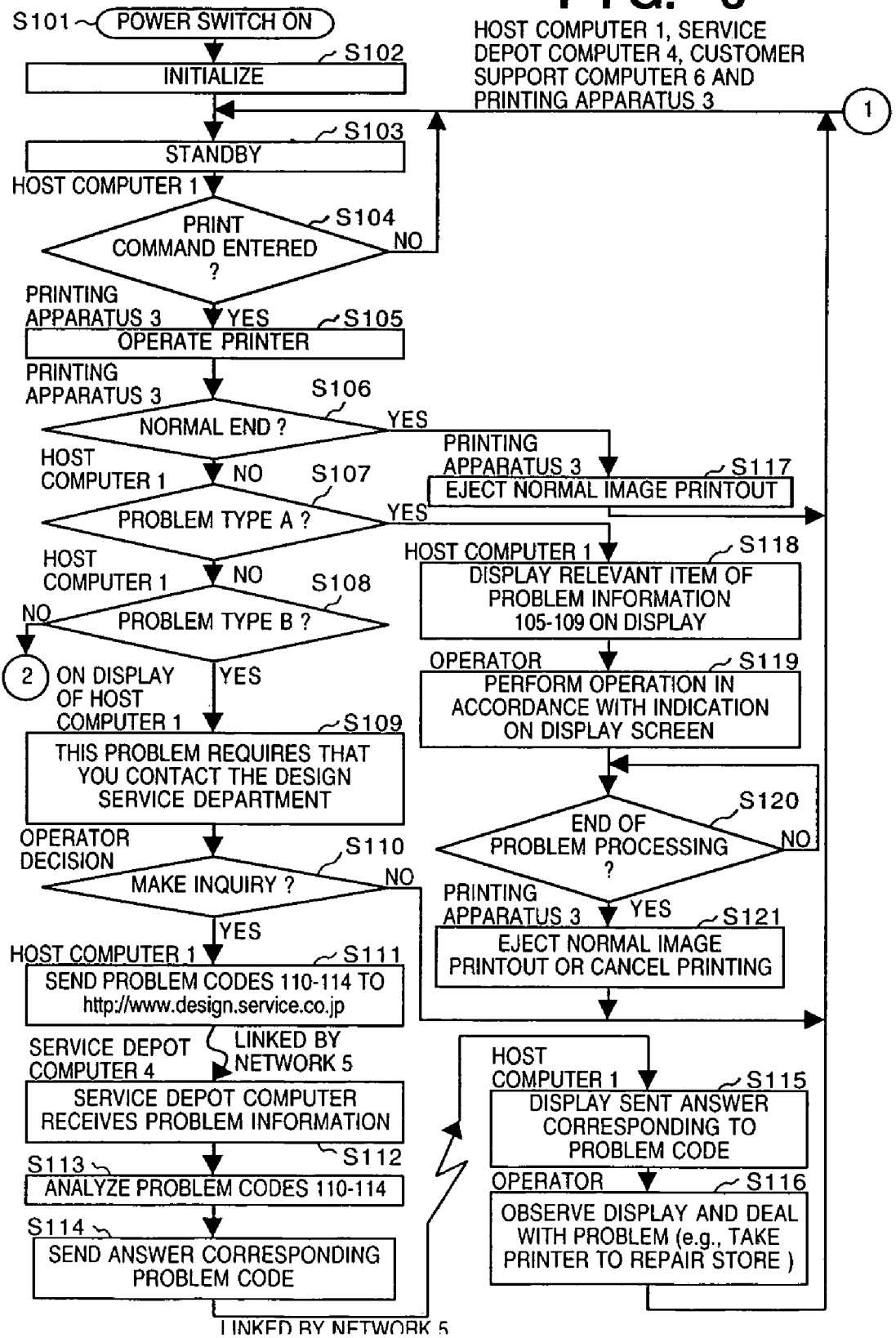
FIG. 6 is a flowchart useful in describing problem management control at execution of a printing control operation in the system of this embodiment.
Figure 7:
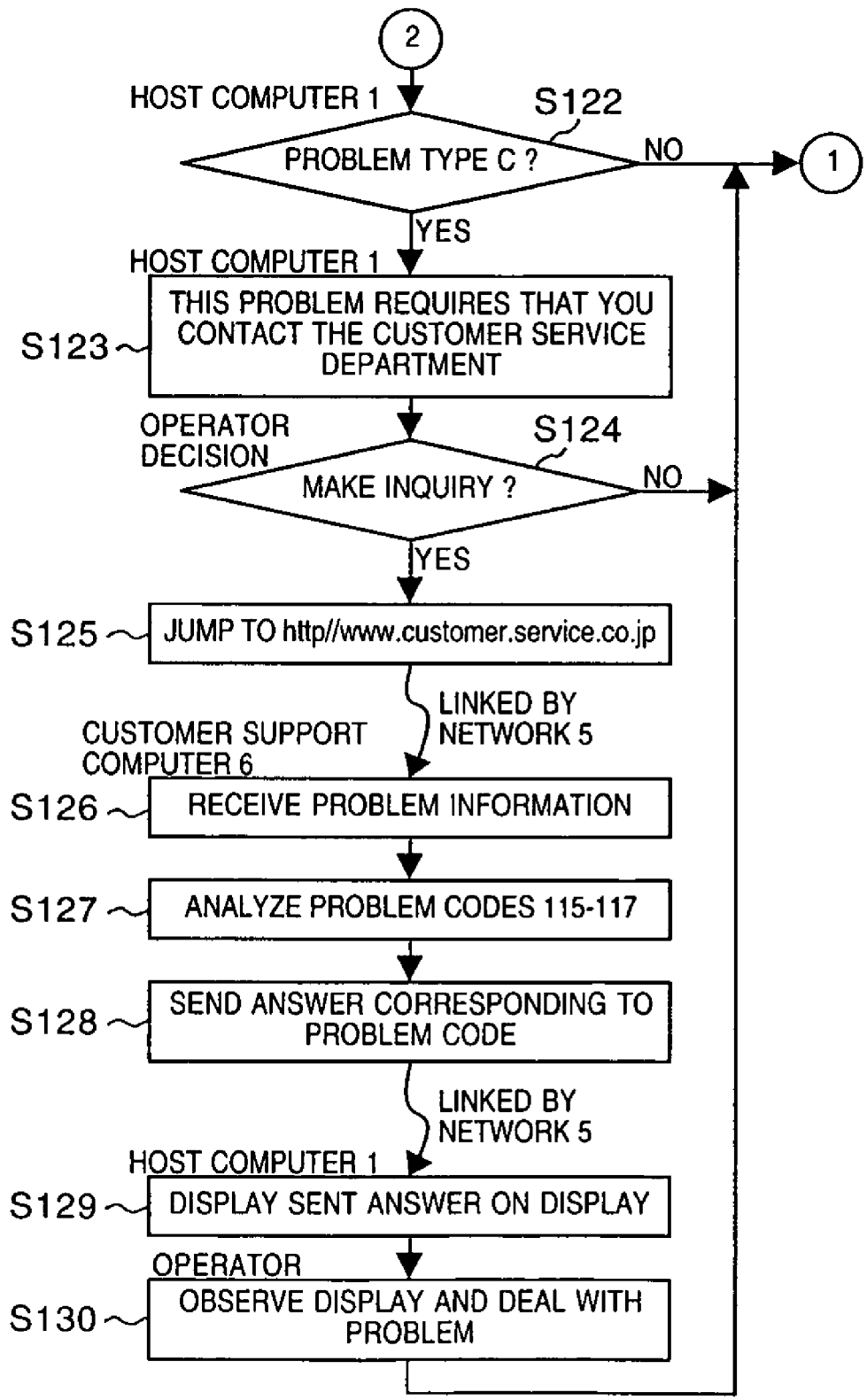
FIG. 7 is a flowchart useful in describing problem management control at execution of a printing control operation in the system of this embodiment.

Reference will now be had to FIGS. 6 and 7 to describe control of the overall operation of the system according to this embodiment. FIGS. 6 and 7 are useful in describing problem management control at execution of a printing control operation in the system of this embodiment.

Preconditions for control are that the host computer 1, service depot computer 4, customer support computer 6 and printing apparatus 3 be connected by the network 5 and cable 2 and that each of these units be supplied with power, as indicated at step S101 in FIG. 6.

When power has been introduced, each unit is initialized at step S102. This initialization processing is executed in accordance with a program incorporated in each unit.

Next, at step S103, the host computer 1, service depot computer 4, customer support computer 6 and printing apparatus 3 attain the usual standby state. In this state the host computer 1 waits for the operator to issue a print command (i.e., to perform a print operation) at steps S103 and S104. For example, the host computer 1 waits for the operator to operate a word processor application (e.g., Microsoft Word), create a document and then perform a printout operation.

When the operator of the host computer 1 issues a print command, control proceeds from step S104 to step S105, at which the printing apparatus 3 performs printing. Next, at step S106, the printing apparatus 3 determines whether printing ended normally. If the decision rendered is "YES", control proceeds to step S117, at which the printing apparatus 3 ejects the normal printed image. Control then returns to step S103.

On the other hand, if the decision rendered at step S106 is that the printing apparatus 3 did not end printing normally, control proceeds to step S107. Here the host computer 1 accepts the problem classification information from the printing apparatus 3. If the problem is not of Type A, control proceeds to step S108.

The host computer 1 determines whether the problem type from the printing apparatus 3 is Type B or not. If the problem is of Type B, control proceeds to step S109, at which the host computer 1 displays the message "THIS PROBLEM REQUIRES THAT YOU CONTACT THE SERVICE DEPOT ('design service') DEPARTMENT" on the display to notify the operator.

This is followed by step S110, at which the operator observes the display of step S109 and decides whether to make an inquiry concerning the problem. If the operator decides not to make an inquiry, control returns to step S103 and the operator does not take immediate measures to deal with the problem.

If the operator decides to make an inquiry at step S110, on the other hand, an indication to this effect is entered. As a result, control proceeds from step S110 to step S111, where the host computer 1 reads out the website address of the service depot computer 4 and sends the problem codes 110 to 114 to this address (http://www.design.service.co.jp) via the network 5.

Next, at step S112, the service depot computer 4 receives any or all of the problem codes 110 to 114 sent from the host computer 1. The service depot computer 4 analyzes the nature of the problem codes 110 to 114 at step S113 in accordance with analytical program of the computer.

This is followed by step S114, at which the service depot computer 4 sends the analytical result of step S113 to the host computer 1, which is linked to it via the network 5, automatically in accordance with an answer program.

The host computer 1 displays the answer sent at step S115 on its display (see the problems of Type B shown in FIG. 5).

By way of example, the following is displayed as an example of an answer in a case where the problem code 110 is sensed by the sensor 110 for sensing power-supply voltage (5 V) of the controller:

"NO 5V DC VOLTAGE. TAKE PRINTER TO SERVICE DEPOT."

The operator checks the answer display provided at step S115 and deals with the problem, such as by taking the printing apparatus 3 to a repair store, as indicated at step S116. Alternatively, the operator requests on-site repair as by calling a serviceman. In this case also the analysis of the nature of the problem ends, as a result of which the appropriate repairs can be made in prompt fashion.

If the problem is found to be of Type A at step s107, control proceeds to step S118, at which the software application of the printer driver automatically judges whether the problem is any of the problem codes 105 to 109 and causes a screen whose content conforms to the problem code to be displayed on the display of the host computer 1. This processing is executed by the host computer 1 alone.

The operator performs an operation at step S119 that is in accordance with the indication on the display screen displayed at step S118.

By way of example, if "NO PAPER" or "CANCEL PRINTING?" is displayed, the operator loads paper or performs an operation to cancel printing, thereby eliminating the problem.

Next, at step S120, the host computer 1 waits for the operator to take appropriate measures. If such measures have been taken, control proceeds to step S121, at which the printing apparatus 3 exercises control conforming to the measures taken, as by ejecting the printout of the normal image or canceling printing and then terminating operation. Control then returns to step S103.

In a case where the type of problem from the printing apparatus 3 is found not to be Type B at step S108, control proceeds to step S122 on the assumption that the problem is of Type C. At this step the host computer 1 determines whether the problem is of Type C. If the information is temporary in nature, such as noise, it is judged that a sensing error has occurred and, hence, control returns to step S103.

On the other hand, if the decision rendered at step S122 is that the problem is of Type C, control proceeds to step S123, where the host computer 1 displays the message "THIS PROBLEM REQUIRES THAT YOU CONTACT THE CUSTOMER SUPPORT DEPARTMENT ('Customer Service Department')" on the display to notify the operator.

This is followed by step S124, at which the operator observes the display of step S123 and decides whether to make an inquiry concerning the problem. If the operator decides not to make an inquiry, control returns to step S103 and the operator does not take immediate measures to deal with the problem.

If the operator agrees to make an inquiry at step S124, on the other hand, control proceeds to step S125, at which the problem codes 115 to 117 of Type C are sent to the customer support computer 6 (to the Internet address (URL) http://www.customer.service.co.jp).

The customer support computer 6 receives the information of problem type C via the network 5 at step S126.

The customer support computer 6 analyzes the received problem codes 115 to 117 at step S127. This is followed by step S128, at which the customer support computer 6 automatically extracts the corresponding answer, on the basis of application software within the customer support computer 6, in accordance with the problem code that was analyzed at step S127, and transfers the answer to the host computer 1 that originally sent the problem codes 115 to 117.

The host computer 1 causes the answer that has been sent to it via the network 5 to be displayed on its display at step S129. Control then proceeds to step S130, at which the operator observes the answer from the customer support computer 6 displayed on the display of the host computer 1 and then deals with the problem. Control thenceforth returns to step S103.

Thus, in accordance with this embodiment, as described above, the nature of a problem can be analyzed automatically and a reply made to the operator, as a result of which appropriate measures can be taken. Further, the cause of a problem can be judged in accurate fashion and it is possible to realize a troubleshooting system that requires low labor cost. In addition, problems can be dealt with rapidly on a round-the-clock basis.

In the foregoing description, inquiries concerning problems are divided between a service depot computer and a customer support computer. The service depot computer is queried with regard to problems relating to the basic components of the machine, namely problems requiring maintenance by a serviceman. In a case where, depending upon the measures taken by the customer, it is possible for the customer to solve the problem himself without the assistance of a serviceman, the customer support computer is queried in regard to the nature of the problem. However, if as a result of querying one of these computers it is judged that more appropriate support can be obtained by querying the other computer, a message to this effect may be displayed in the answer given.

Further, the nature of a problem can be analyzed reliably and in automatic fashion and the appropriate countermeasure can be indicated to the operator. Since this indication can be made automatically on the computer side, there is no longer any limitation upon time that support is available. For example, 24-hour support can be provided. In this case also the depot computers 4 and 6 or the host computer 1 can be provide support automatically. This makes possible a troubleshooting system with low labor costs, in which it is unnecessary for personnel to stand by waiting for an inquiry.

Furthermore, by providing a printer with computer address information, the operator can be reliably notified of the computer site that can best deal with the printer problem. This makes it possible to cope with problems in suitable fashion.

Second Embodiment

The first embodiment described above illustrates an example of a case where there is only one combination of a host computer 1 and a printer 3 connected to it by a cable. However, the present invention is not limited to such an example, for a plurality of combinations of the host computer 1 and printing apparatus 3 connected by the cable 2 may be provided.

Figure 8:
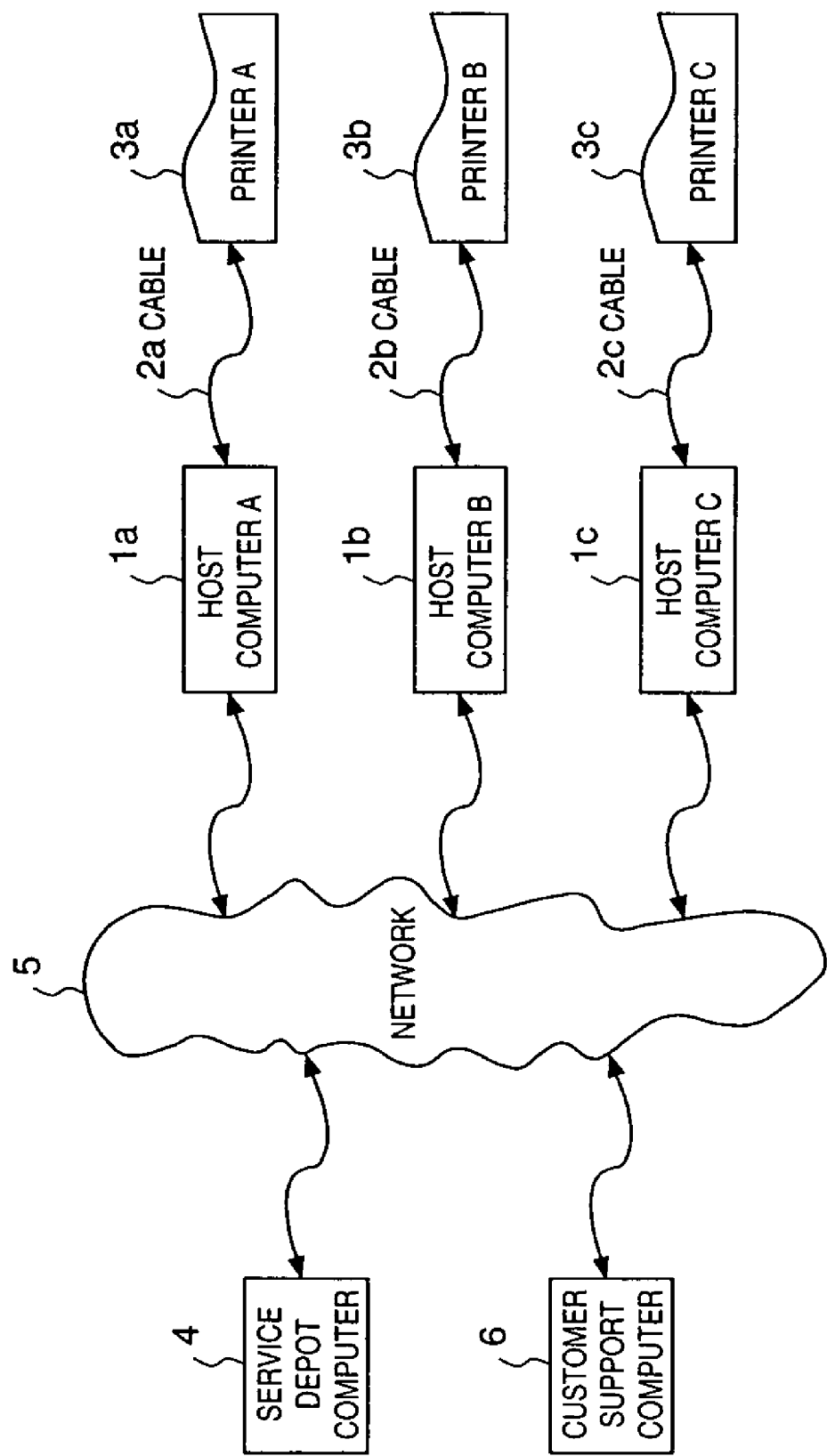
FIG. 8 is a diagram showing the configuration of a system according to a second embodiment of the present invention.

Reference will be had to FIG. 8 to describe a second embodiment of the invention in which there are a plurality of combinations of the host computer 1 and printing apparatus 3 connected by the cable 2. FIG. 8 is a diagram showing the configuration of a system according to a second embodiment of the present invention.

As shown in FIG. 8, there are three combinations of host computers and printers connected to them by cables, namely a host computer 1a and a printer 3a connected by a cable 2a, a host computer 1b and a printer 3b connected by a cable 2b, and a host computer 1c and a printer 3c connected by a cable 2c. Support can of course be provided in exactly the same manner in this case as well.

In this case, it will suffice if each combination of host computer and printer connected via a cable is provided with functions similar to those of the host computer 1 and printing apparatus 3 connected via cable 2 illustrated in FIG. 1 of the first embodiment.

In accordance with the second embodiment, as described above, actions and effects similar to those of the first embodiment are obtained even if there are a large number of combinations of host computers and printers connected to them by cables.

Although an example in which there are three combinations of host computers and printers connected to them by cables has been described in conjunction with FIG. 8, the number of combinations is not limited to three and any number of combinations may be provided as a matter of course.

Third Embodiment

In the foregoing description, inquiries concerning problems are divided between a service depot computer and a customer support computer. The service depot computer is queried with regard to problems relating to the basic components of the machine, namely problems requiring maintenance by a serviceman. In a case where, depending upon the measures taken by the customer, it is possible for the customer to solve the problem himself without the assistance of a serviceman, the customer support computer is queried in regard to the nature of the problem. However, the present invention is not limited to this example, for problems may be dealt with solely by, e.g., the service depot computer without dividing computers between the service depot computer and the customer support computer. The aforementioned problems can be dealt with by providing solely the depot computer with a powerful troubleshooting program.

FIG. 9 illustrates a third embodiment of the present invention adapted to deal with problems using only a service depot computer.

In the third embodiment shown in FIG. 9, problems that can be dealt with by the host computers 1a, 1b and 1c are handled by the host computers 1a, 1b and 1c. In the case of problems of Types B and C mentioned in the first embodiment, the website address of the service depot computer 4 is read out and the problem codes 110 to 114 and problem codes 115 to 117 are sent to the website address (http://www.design.service.co.jp) of the service depot computer 4 together via the network 5.

Thus, in accordance with the third embodiment as described above, actions and effects similar to those of the first embodiment are obtained solely with the service depot computer.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the functions of the above-described embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiment.

In a case where the present invention is applied to the above-mentioned storage medium, program code corresponding to the flowcharts described earlier are stored on the storage medium.

Thus, in accordance with the present invention, as described above, the nature of a specific event can be analyzed reliably and in automatic fashion and the appropriate countermeasure can be indicated to the operator. Since this indication can be made automatically on the side of the information processing apparatus, there is no longer any limitation upon time that support is available. For example, 24-hour support can be provided. In this case also the information processing apparatus can be provide support automatically, thereby making it possible to achieve a troubleshooting system having low labor cost.

Further, by providing the information processing apparatus with information regarding a site where analysis is available, the operator can be reliably notified of the analysis site that can deal properly with a specific event that occurred in the information processing apparatus.

As many apparently widely different embodiments of the present invention can be made without departing from the spirit and scope thereof, it is to be understood that the invention is not limited to the specific embodiments thereof except as defined in the appended claims.

What is claimed is:

1. A printing system for determining whether a particular printer error status requires the display of corresponding countermeasure information stored in said system permitting the operator of said system alone to solve a printing problem associated with the particular printer error status or whether the printing problem requires the intervention of service personnel or corresponding countermeasure information not stored in said system in response to receipt of notice of the particular printer error status, said system comprising:

a printer apparatus including output means for performing a printing operation based on printing data transmitted via a communication line and notice means for sending to an information processing apparatus a notice showing a status of said printer apparatus; and an information processing apparatus including a display unit, a memory, identification means for identifying the notice sent by said notice means, and control means comprising at least one of the following means:

A) first means for controlling, when the notice is identified as a first type of notice, the display unit to display corresponding countermeasure information, which is stored in said memory in advance, in accordance with the first type of notice, wherein the display is not a forwarding URL but corresponding countermeasure information permitting the operator alone to solve the printing problem associated with the first type of notice, and for controlling, when the notice is identified as a second type of notice for which corresponding countermeasure information is not stored in said memory in advance, the display unit to display a forwarding first URL identifying a web address at which the service-personnel can be contacted for service-personnel intervention and to perform a request display for prompting the operator to instruct whether or not to connect to the first URL to obtain information relating to the contacting of service-personnel for service-personnel intervention to solve the printing problem associated with the second type of notice; and B) second means for controlling, when the notice is identified as a first type of notice, the display unit to display corresponding countermeasure information, which is stored in said memory in advance, in accordance with the first type of notice, wherein the display is not a forwarding URL but corresponding countermeasure information permitting the operator alone to solve the printing problem associated with the first type of notice, and for controlling, when the notice is identified as a third type of notice for which corresponding countermeasure information is not stored in said memory in advance, the display unit to display a forwarding second URL identifying a web address from which corresponding countermeasure information for solving the printing problem associated with the third type of notice can be retrieved and to perform a request display for prompting the operator to instruct whether or not to connect to the second URL to obtain the corresponding countermeasure information in accordance to the third type of notice, wherein said information processing apparatus is connected to the Internet when the connection to the first URL or the second URL is instructed, wherein the corresponding countermeasure information or information relating to service-personnel intervention for the particular printing problem is obtained via the Internet based on the first or second URL and is displayed on the display unit of said information processing apparatus.

2. The system according to claim 1, wherein said control means comprises said first means.

3. The system according to claim 1, wherein said control means comprises said second means.

4. The system according to claim 1, wherein said control means comprises said first means and said second means.

5. The system according to claim 2, wherein the third type of notice corresponds to a problem that can be eliminated by an operator's endeavor without requiring assistance of a serviceman.

6. The system according to claim 1, wherein said printer apparatus comprises an inkjet printer.

7. An information processing apparatus communicating with a printer apparatus for determining whether a particular printer error status requires the display of corresponding countermeasure information stored in said information processing apparatus permitting the operator of said information processing apparatus alone to solve a printing problem associated with the particular printer error status or whether the printing problem requires the intervention of service personnel or corresponding countermeasure information not stored in said information processing apparatus in response to receipt of notice of the particular printer error status from the printer apparatus, said information processing apparatus comprising:

a display unit;

a memory;

receiving means for receiving a notice showing a status of the printer apparatus;

identification means for identifying the notice; and control means comprising at least one of the following means:

A) first means for controlling, when the notice is identified as a first type of notice, said display unit to display corresponding countermeasure information, which is stored in said memory in advance in accordance with the first type of notice, wherein the display is not a forwarding URL but corresponding countermeasure information permitting the operator alone to solve the printing problem associated with the first type of notice, and for controlling, when the notice is identified as a second type of notice for which corresponding countermeasure information is not stored locally in said memory in advance, said display unit to display a forwarding first URL identifying a web address at which the service-personnel can be contacted for service-personnel intervention and to perform a request display for prompting the operator to instruct whether or not to connect to the first URL obtain information relating to the contacting of service-personnel for service-personnel intervention to solve the printing problem associated with the second type of notice; and B) second means for controlling, when the notice is identified as a first type of notice, the display unit to display corresponding countermeasure information, which is stored in said memory in advance, in accordance with the first type of notice, wherein the display is not a forwarding URL but corresponding countermeasure information permitting the operator alone to solve the printing problem associated with the first type of notice, and for controlling, when the notice is identified as a third type of notice for which corresponding countermeasure information is not stored in said memory in advance, the display unit to display a forwarding second URL identifying a web address from which corresponding countermeasure information for solving the printing problem associated with the third type of notice can be retrieved and to perform a request display for prompting the operator to instruct whether or not to connect to the second URL to obtain the corresponding countermeasure information in accordance to the third type of notice, wherein said information processing apparatus is connected to the internet when the connection to the first URL or the second URL is instructed, and wherein the corresponding countermeasure information or information relating to service-personnel intervention for the particular printing problem is obtained via the Internet based on the first or second URL and is displayed on said display unit of said information processing apparatus.

8. The apparatus according to claim 7, wherein said control comprises said first means.

9. The apparatus according to claim 7, wherein said control means comprises said second means.

10. The apparatus according to claim 7, wherein said control means comprises said first means and said second means.

11. The apparatus according to claim 8, wherein the third type of notice corresponds to a problem that can be eliminated by an operator's endeavor without requiring assistance of a serviceman.

12. An information processing method in an information processing apparatus having a display unit and a memory and communicating with a printer apparatus, said method for determining whether a particular printer error status requires the display of corresponding countermeasure information stored in the information processing apparatus permitting the operator of the apparatus alone to solve a printing problem associated with the particular printer error status or whether the printing problem requires the intervention of service personnel or corresponding countermeasure information not stored in the information processing apparatus in response to receipt of notice of the particular printer error status, said method comprising:

a receiving step of receiving a notice showing a status of the printer apparatus;

an identifying step of identifying the notice; and a controlling step comprising at least one of the following steps:

A) a first step of controlling, when the notice is identified as a first type of notice, the display unit to display corresponding countermeasure information which is stored in said memory in advance in accordance with the first type of notice, wherein the display is not a forwarding URL but corresponding countermeasure information permitting the operator alone to solve the printing problem associated with the first type of notice, and controlling, when the notice is identified as a second type of notice for which corresponding countermeasure information is not stored in said memory in advance, the display unit to display a forwarding first URL identifying a web address at which the service-personnel can be contacted for service-personnel intervention and to perform a request display for prompting the operator to instruct whether or not to connect to the first URL to obtain information relating to the contacting of service-personnel for service-personnel intervention to solve the printing problem associated with the second type of notice; and B) a second step of controlling, when the notice is identified as a first type of notice, the display unit to display corresponding countermeasure information, which is stored in said memory in advance, in accordance with the first type of notice, wherein the display is not a forwarding URL but corresponding countermeasure information permitting the operator alone to solve the printing problem associated with the first type of notice, and controlling, when the notice is identified as a third type of notice for which corresponding countermeasure information is not stored in said memory in advance, the display unit to display a forwarding second URL identifying a web address from which corresponding countermeasure information for solving the printing problem associated with the third type of notice can be retrieved and to perform a request display for prompting the operator to instruct whether or not to connect to the second URL to obtain the corresponding countermeasure information in accordance to the third type of notice, wherein the information processing apparatus is connected to the internet when the connection to the first or the second URL is instructed, and wherein the corresponding countermeasure information or information relating to service-personnel intervention for the particular printing problem is obtained via the internet based on the first or second URL and is displayed on the display unit of the information processing apparatus.

13. The method according to claim 12, wherein said controlling step comprises said first step.

14. The method according to claim 12, wherein said controlling step comprises said second step.

15. The method according to claim 12, wherein said controlling step comprises said first step and said second step.

16. The method according to claim 13, wherein the third type of notice corresponds to a problem that can be eliminated by an operator's endeavor without requiring assistance of a serviceman.

17. A computer readable storage medium storing a computer program for an information processing apparatus having a display unit and a memory and communicating with a printer apparatus, said computer program for determining whether a particular printer error status requires the display of corresponding countermeasure information stored in the apparatus permitting the operator of the apparatus alone to solve a printing problem associated with the particular printer error status or whether the printing problem requires the intervention of service personnel or corresponding countermeasure information not stored in the apparatus in response to receipt of notice of the particular printer error status, said computer program comprising:
   code to receive a notice showing a status of the printer apparatus;
   code to identify the notice; and
   control code comprising at least one of the following codes:
      A) first code
         to control, when the notice is identified as a first type of notice, the display unit to display corresponding countermeasure information which is stored in the memory in advance, in accordance with the first type of notice, wherein the display is not a forwarding URL but corresponding countermeasure information permitting the operator alone to solve the printing problem associated with the first type of notice, and
         to control, when the notice is identified as a second type of notice for which corresponding countermeasure information is not stored in said memory in advance, the display unit to display a forwarding first URL identifying a web address at which the service-personnel can be contacted for service-personnel intervention and to perform a request display for prompting an operator to instruct whether or not to connect to the first URL to obtain information relating to the contacting of service-personnel for service-personnel intervention to solve the printing problem associated with the second type of notice; and
      B) second code
         to control, when the notice is identified as a first type of notice, the display unit to display corresponding countermeasure information, which is stored in said memory in advance, in accordance with the first type of notice, wherein the display is not a forwarding URL but corresponding countermeasure information permitting the operator alone to solve the printing problem associated with the first type of notice, and
         to control, when the notice is identified as a third type of notice for which corresponding countermeasure information is not stored in said memory in advance, the display unit to display a forwarding second URL identifying a web address from which corresponding countermeasure information for solving the printing problem associated with the third type of notice can be retrieved and to perform a request display for prompting the operator to instruct whether or not to connect to the second URL to obtain the corresponding countermeasure information in accordance to the third type of notice,
   wherein the information processing apparatus is connected to the internet when the connection to the first or the second URL is instructed and wherein the corresponding countermeasure information or information relating to service-personnel intervention for the particular printing problem is obtained via the internet based on the first or second URL and is displayed on the display unit of the information processing apparatus.

18. The computer readable storage medium according to claim 17, wherein the control code comprises said first code.

19. The computer readable storage medium according to claim 17, wherein the control code comprises said second code.

20. The computer readable storage medium according to claim 17, wherein the control code comprises said first code and said second code.

21. The computer readable storage medium according to claim 18, wherein the third type of notice shows a case where a problem can be eliminated by an operator's endeavor without requiring assistance of a serviceman.

22. The printing system according to claim 1, wherein said identification means includes a classification table showing whether the notice is the first type or other types.

23. The printing system according to claim 1, wherein the display in said information processing apparatus and the instruction by the operator is processed by a printer driver installed in said information processing apparatus.

24. A printing apparatus having an abnormal diagnosis function for various portions of said apparatus and for receiving printing data from a host computer said printing apparatus comprising:
   memory means that stores information designating problem contents which are identification codes allocated depending on problem types in advance and forwarding address information designating a forwarding address which is a communication address of an other computer connected to a network to which the host computer is connectable,
   wherein said memory means comprises at least one of the following means:
      first means for storing:
         a first identification code representing a first printing problem, which, in response to receipt of which, the host computer displays corresponding countermeasure information which is stored therein in advance, wherein the displayed countermeasure information is not a forwarding URL but corresponding countermeasure information permitting the operator alone to solve the first printing problem associated with the first identification code;

a second identification code representing a second printing problem for which corresponding countermeasure information is not stored in the host computer in advance; and a first URL associated with the second identification code so that when said second identification code is sent to the host computer, the first URL is also sent to the host computer, the first URL identifying a web address at which the service-personnel can be contacted for service-personnel intervention, wherein in response to receipt of the second identification code and the first URL from said printing apparatus, the host computer displays a prompt for prompting the operator to instruct whether or not to connect to the first URL to obtain information relating to the contacting of service-personnel for service-personnel intervention to solve the second printing problem associated with the second identification code; and second means for storing:

the first identification code representing a first printing problem, which, in response to receipt of which, the host computer displays corresponding countermeasure information which is stored therein in advance, wherein the displayed countermeasure information is not a forwarding URL but corresponding countermeasure information permitting the operator alone to solve the first printing problem associated with the first identification code;

a third identification code representing a third printing problem for which corresponding countermeasure information is not stored in the host computer in advance; and a second URL associated with the third identification code so that when said third identification code is sent to the host computer, the second URL is also sent to the host computer, the second URL identifying a web address from which corresponding countermeasure information for solving the third printing problem can be retrieved, wherein in response to receipt of the third identification code and the second URL from said printing apparatus, the host computer displays a prompt for prompting the operator to instruct whether or not to connect to the second URL to obtain the corresponding countermeasure information to solve the third printing problem; and communication means that sends the information designating problem contents corresponding to a result of the abnormal diagnosis function and the forwarding address information, wherein said communication means comprises at least one of:

first transmitting means for transmitting the first identification code to the host computer when said printing apparatus performs its abnormal diagnosis function and determines that the first printing problem exists and for transmitting the second identification code and the first URL to the host computer when said printing apparatus performs its abnormal diagnosis function and determines that the second printing problem exists; and second transmitting means for transmitting the first identification code to the host computer when said printing apparatus performs its abnormal diagnosis function and determines that the first printing problem exists and for transmitting the third identification code and the second URL to the host computer when said printing apparatus performs its abnormal diagnosis function and determines that the third printing problem exists, wherein said communication means comprises said first transmitting means when said memory means comprises said first means, and wherein said communication means comprises said second transmitting means when said memory means comprises said second means.

25. The printing apparatus according to claim 24, wherein said memory means comprises only one of said first means and said second means, and said communication means comprises only one of said first transmitting means and said second transmitting means.

26. The printing apparatus according to claim 24, wherein said memory means comprises both said first means and said second means, and said communication means comprises both said first transmitting means and said second transmitting means.

27. A host computer connected to a printing apparatus, wherein the printing apparatus has an abnormal diagnosis function for various portions of the apparatus, and wherein said host computer supplies printing data to the printing apparatus, and reports problem content to an operator when information designating problem content is received from the printing apparatus, wherein the printing apparatus comprises storage means that stores information designating problem content and forwarding address information designating a forwarding address, and communication means that sends the information designating problem content corresponding to a result of the abnormal diagnosis function and the forwarding address information, the host computer comprising:

receiving means that receives the information designating the problem content and the forwarding address information from the printing apparatus;

sending means that sends the received information designating the problem content to the forwarding address designated by the received forwarding address information, wherein the information designating the problem content is an identification code allocated depending on problem types in advance, and wherein the forwarding address information is a communication address of the other computer connected to a network to which the host computer is connectable; and control means comprising at least one of the following means:

A) first means for controlling, when the received identification code represents a first type of printing problem, said host computer to instruct the displaying of corresponding countermeasure information permitting the operator alone to solve the first type of printing problem, the displayed countermeasure information not being a forwarding URL and being stored in said host computer in advance, and controlling, when the received identification code represents a second type of printing problem for which corresponding countermeasure information is not stored in said host computer in advance, said host computer to instruct the displaying of a forwarding first URL identifying a web address at which the service-personnel can be contacted for service-personnel intervention and to instruct the displaying of a request display for prompting the operator to instruct whether or not to connect to the first URL to obtain information relating to the contacting of service-personnel for service-personnel intervention to solve the second type of printing problem; and B) second means for controlling, when the received identification code represents a first type of printing problem, said host computer to instruct the displaying of corresponding countermeasure information permitting the operator alone to solve the first type of printing problem, the displayed countermeasure information not being a forwarding URL and being stored in said host computer in advance, and controlling, when the received identification code represents a third type of printing problem for which corresponding countermeasure information is not stored in said memory in advance, controlling said host computer to instruct the displaying of a forwarding second URL identifying a web address from which corresponding countermeasure information for solving the third type of printing problem can be retrieved and to instruct the displaying of a request display for prompting the operator to instruct whether or not to connect to the second URL to obtain the corresponding countermeasure information to solve the third type of printing problem, wherein said host computer is connected to the Internet when the connection to the first URL or the second URL is instructed, wherein the corresponding countermeasure information or information relating to service-personnel intervention for the particular printing problem is obtained via the Internet based on the first or second URL and is instructed to be displayed by the host computer.

28. The host computer according to claim 27, wherein said control means comprises said first means.

29. The host computer according to claim 27, wherein said control means comprises said second means.

30. The host computer according to claim 29, wherein said control means comprises said first means and said second means.

31. A control method for a printing apparatus having an abnormal diagnosis function for various portions of said apparatus and for receiving printing data from a host computer and prints, said method comprising the steps of:

storing information designating problem contents which are identification codes allocated depending on problem types in advance and forwarding address information designating a forwarding address which is a communication address of an other computer connected to a network to which the host computer is connectable, wherein said storing step comprises at least one of the following steps:

a first step for storing:

a first identification code representing a first printing problem, which, in response to receipt of which, the host computer displays corresponding countermeasure information which is stored therein in advance, wherein the displayed countermeasure information is not a forwarding URL but corresponding countermeasure information permitting the operator alone to solve the first printing problem associated with the first identification code;

a second identification code representing a second printing problem for which corresponding countermeasure information is not stored in the host computer in advance; and a first URL associated with the second identification code so that when said second identification code is sent to the host computer, the first URL is also sent to the host computer, the first URL identifying a web address at which the service-personnel can be contacted for service-personnel intervention, wherein in response to receipt of the second identification code and the first URL from said printing apparatus, the host computer displays a prompt for prompting the operator to instruct whether or not to connect to the first URL to obtain information relating to the contacting of service-personnel for service-personnel intervention to solve the second printing problem associated with the second identification code; and a second step for storing:

the first identification code representing a first printing problem, which, in response to receipt of which, the host computer displays corresponding countermeasure information which is stored therein in advance, wherein the displayed countermeasure information is not a forwarding URL but corresponding countermeasure information permitting the operator alone to solve the first printing problem associated with the first identification code;

a third identification code representing a third printing problem for which corresponding countermeasure information is not stored in the host computer in advance; and a second URL associated with the third identification code so that when said third identification code is sent to the host computer, the second URL is also sent to the host computer, the second URL identifying a web address from which corresponding countermeasure information for solving the third printing problem can be retrieved, wherein in response to receipt of the third identification code and the second URL from said printing apparatus, the host computer displays a prompt for prompting the operator to instruct whether or not to connect to the second URL to obtain the corresponding countermeasure information to solve the third printing problem; and sending the information designating a problem content corresponding to a result of the abnormal diagnosis function and the forwarding address information, wherein said sending step comprises at least one of:

a first transmitting step for transmitting the first identification code to the host computer when said printing apparatus performs its abnormal diagnosis function and determines that the first printing problem exists and for transmitting the second identification code and the first URL to the host computer when said printing apparatus performs its abnormal diagnosis function and determines that the second printing problem exists; and a second transmitting step for transmitting the first identification code to the host computer when said printing apparatus performs its abnormal diagnosis function and determines that the first printing problem exists and for transmitting the third identification code and the second URL to the host computer when said printing apparatus performs its abnormal diagnosis function and determines that the third printing problem exists, wherein said sending step comprises said first transmitting step when said storing step comprises said first step, and wherein said sending step comprises said second transmitting step when said storing step comprises said second step.

32. The control method according to claim 31, wherein said storing step comprises only one of said first step and said second step, and said sending step comprises only one of said first transmitting step and said second transmitting step.

33. The control method according to claim 31, wherein said storing step comprises both said first step and said second step, and said sending step comprises both said first transmitting step and said second transmitting step.

34. A control method for a host computer connected to a printing apparatus, the printing apparatus having an abnormal diagnosis function for various portions of the apparatus, the host computer supplying printing data to the printing apparatus, and reporting problem content to an operator when information designating problem content is received from the printing apparatus, wherein the printing apparatus comprises storage means to store information designating problem content and forwarding address information designating forwarding address, and communication means to send the information designating a problem content corresponding to the result of the abnormal diagnosis function and the forwarding address information, said control method for the host computer comprising the steps of:

receiving the information designating the problem content and the forwarding address information from the printing apparatus; and sending the received information designating the problem contents to the forwarding address designated by the received forwarding address information, wherein the information designating the problem content is identification code allocated depending on problem types in advance, and wherein the forwarding address information designating forwarding address which is a communication address of the other computer connected to a network to which the host computer is connectable, and controlling the display of information comprising at least one of the following steps:

A) a first step for controlling, when the received identification code represents a first type of printing problem, said host computer to instruct the displaying of corresponding countermeasure information permitting the operator alone to solve the first type of printing problem, the displayed countermeasure information not being a forwarding URL and being stored in said host computer in advance, and controlling, when the received identification code represents a second type of printing problem for which corresponding countermeasure information is not stored in said host computer in advance, said host computer to instruct the displaying of a forwarding first URL identifying a web address at which the service-personnel can be contacted for service-personnel intervention and to instruct the displaying of a request display for prompting the operator to instruct whether or not to connect to the first URL to obtain information relating to the contacting of service-personnel for service-personnel intervention to solve the second type of printing problem; and B) a second step for controlling, when the received identification code represents a first type of printing problem, said host computer to instruct the displaying of corresponding countermeasure information permitting the operator alone to solve the first type of printing problem, the displayed countermeasure information not being a forwarding URL and being stored in said host computer in advance, and controlling, when the received identification code represents a third type of printing problem for which corresponding countermeasure information is not stored in said memory in advance, controlling said host computer to instruct the displaying of a forwarding second URL identifying a web address from which corresponding countermeasure information for solving the third type of printing problem can be retrieved and to instruct the displaying of a request display for prompting the operator to instruct whether or not to connect to the second URL to obtain the corresponding countermeasure information to solve the third type of printing problem, wherein said host computer is connected to the Internet when the connection to the first URL or the second URL is instructed, and wherein the corresponding countermeasure information or information relating to service-personnel intervention for the particular printing problem is obtained via the Internet based on the first or second URL and is instructed to be displayed by the host computer.

35. The control method for a host computer according to claim 34, said controlling step comprises said first step.

36. The control method for a host computer according to claim 34, wherein said controlling step comprises said second step.

37. The control method for a host computer according to claim 36, wherein said controlling step comprises said first step and said second step.

* * * * *

UNITED STATES PATENT AND TRADEMARK OFFICE
CERTIFICATE OF CORRECTION

PATENT NO. : 7,148,979 B1 Page 1 of 1
APPLICATION NO. : 09/482872
DATED : December 12, 2006
INVENTOR(S) : Hitoshi Yanagawa It is certified that error appears in the above-identified patent and that said Letters Patent is hereby corrected as shown below:

COLUMN 13:
Line 34, "be" should be deleted.

COLUMN 15:
Line 31, claim 7 "obtain" should read --to obtain--.
Line 54, claim 7 "to" should read --with--.
Line 65, claim 7 "control" should read --control means--.

COLUMN 18:
Line 15, claim 17 "to" should read --with--.
Line 46, claim 24 "computer" should read --computer,--.
Line 52, claim 24 "an other" should read --another--.

COLUMN 21:
Line 50, claim 31 "an other" should read --another--.

COLUMN 24:
Line 43, claim 35 "claim 34," should read --claim 34, wherein--.

Signed and Sealed this

Thirteenth Day of May, 2008

JON W. DUDAS
*Director of the United States Patent and Trademark Office*